June 7, 1938.  J. H. DORAN  2,120,092
CLUTCH
Filed Aug. 6, 1936  2 Sheets-Sheet 1
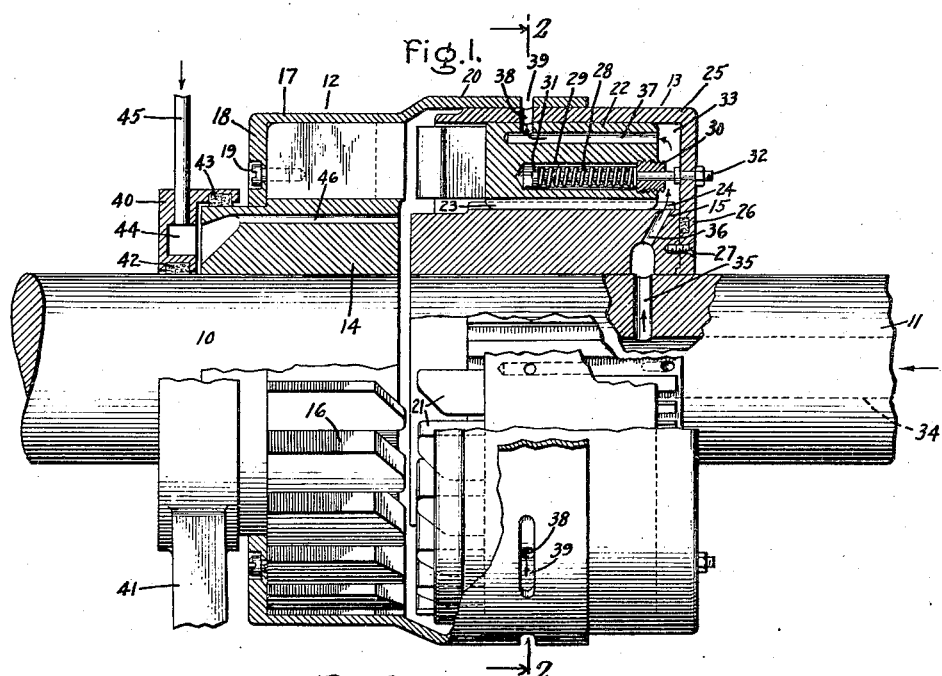
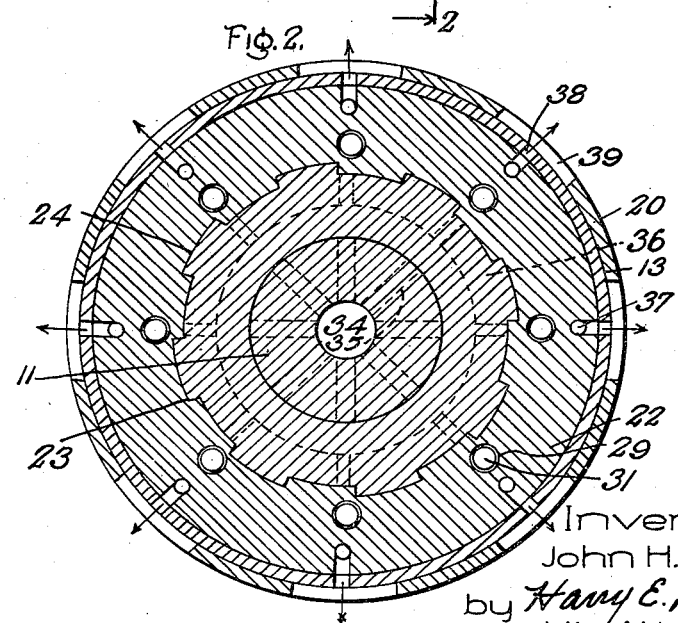
Inventor:
John H. Doran,
by Harry E. Dunham
His Attorney.

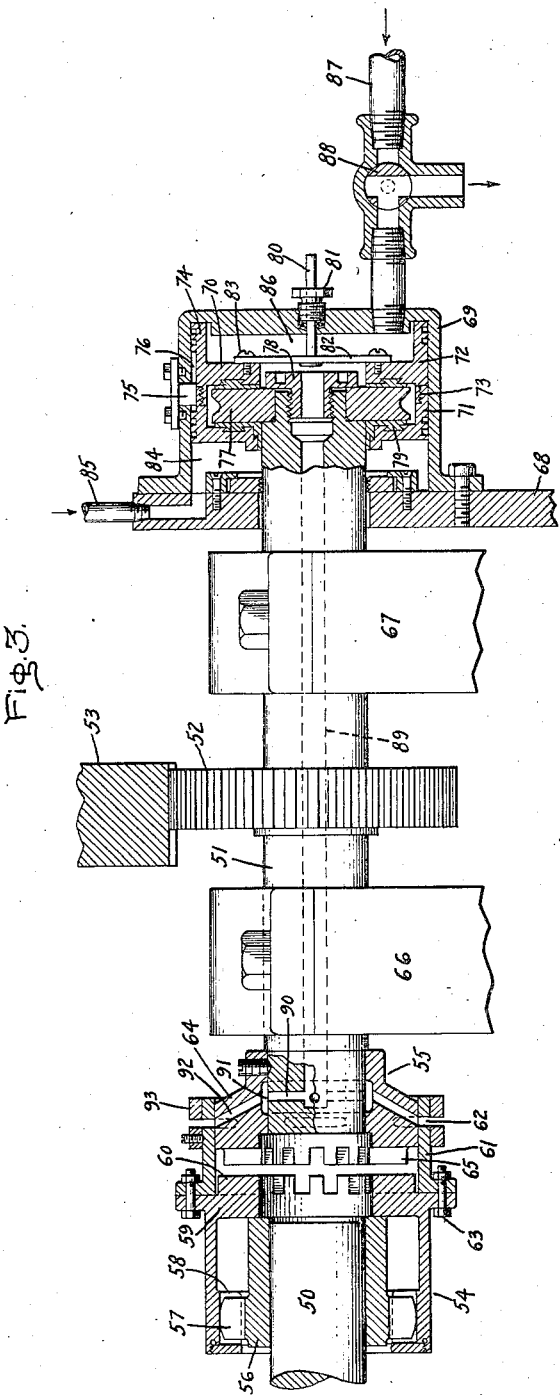

Patented June 7, 1938

2,120,092

UNITED STATES PATENT OFFICE 2,120,092

CLUTCH

John H. Doran, Scotia, N. Y., assignor to General Electric Company, a corporation of New York Application August 6, 1936, Serial No. 94,623

11 Claims. (Cl. 192—67)

The present invention relates to clutches for mechanically connecting rotatable shafts or like movable elements. More specifically the invention relates to clutches for connecting two turbine or other prime mover shafts or prime mover operated elements during operation though it is not necessarily limited thereto.

The object of my invention is to provide an improved clutch construction and arrangements whereby two shafts may be automatically connected in response to a predetermined fixed speed relation of the shafts.

For a consideration of what I believe to be novel and my invention, attention is directed to the following description and the claims appended thereto in connection with the accompanying drawings.

In the drawings Fig. 1 represents a clutch arrangement embodying my invention, Fig. 2 is a section along line 2—2 of Fig. 1, and Fig. 3 illustrates a modification of my invention.

The clutch arrangement shown in Fig. 1 serves for automatically connecting two shafts 10 and 11 when the two shafts run substantially in synchronism that is in response to predetermined fixed speed relation of the shafts. The clutch comprises two halves 12 and 13 and each half has an element 14 and 15 respectively rigidly secured to the corresponding shaft 10 and 11. The clutch half 12 has a row of teeth 16 formed on the outer cylindrical surface of the element 14. The teeth 16 are enclosed by a cylinder 17 which has a bottom 18 secured to the teeth 16 by a plurality of screws 19. The right-hand portion of the cylinder 17 forms an extension 20 projecting axially beyond the right-hand end of the teeth 16. The other clutch half 13 in addition to the aforementioned element 15 has a row of teeth 21 which are formed on the left-hand face of an axially movable ring 22. The inner cylindrical surface of the ring 22 forms a row of teeth or splines 23 which mesh with a row of teeth or splines 24 formed on the outer cylindrical surface of the element 15. With this arrangement the ring member 22 is positively rotated by the element 15 but may move axially relative to the latter. The ring 22 with its teeth 21 is surrounded by a cylinder 25 which has a bottom 26 secured to the element 15 by a plurality of screws 27. A portion of the cylinder 25 telescopes the extension 20 of the cylinder 17 of the other clutch half. The axially movable ring 22 is biased towards the right, that is, into disengaging positon by means including a plurality of compression springs 28 disposed in axial bores 29 of the ring 22. Each spring bears at its right-hand end against a plug 30 secured in the opening 29 and at its left-hand end against an abutment 31 on the left-hand end of a bolt 32 secured to the bottom 26 of the cylinder 25. The springs being under compression force the ring member 22 towards the right, that is, away from the teeth 16 of the other clutch half.

My invention includes the provision of means for effecting automatic engagement between the teeth of the two clutch halves when the speeds of the two shafts are equal or nearly equal. To this end channels are provided for conducting actuating fluid, preferably liquid, under pressure to a fluid pressure chamber 33 defined between the right-hand end face of the ring member 22 and the cylinder 25. These channels are formed by an axial bore 34 in the shaft 11 which communicates through a radial bore 35 in the shaft 11 and a bore 36 in the element 15 with the annular space or chamber 33. Actuating fluid may be discharged from the chamber 33 through a plurality of bores 37 in the axially movable ring member 22. The bores 37 communicate with the atmosphere or other suitable point through a plurality of circumferentially uniformly spaced bores 38 in the cylinder 25 and a plurality of uniformly spaced slots 39 in the extension 20 of the cylinder 17 of the other clutch half. It is important to note that communication between the chamber 33 and the atmosphere through the bores and openings 37, 38 and 39 is established only as long as the bores 38 of the cylinder 25 register with the slots 39 in the extension 20 of the cylinder 17.

Lubricant is conducted to the clutch to reduce wear of the teeth by means including a stationary ring 40 supported on a pedestal 41 and sealed against the shaft by a packing ring 42 and against the outer surface of the element 14 by a packing ring 43. The ring 40 has an annular groove 44 to which lubricant is conducted by a pipe 45. Lubricant is conducted from the chamber 44 to the operating elements of the clutch through a channel or channels 46 in the clutch element 14.

The operation of the clutch is as follows: The bore 34 is normally connected to a source, (not shown) of actuating fluid under pressure to assure a continuous supply of fluid to the annular chamber 33 when the clutch is to be engaged. No pressure is built up in the chamber 33 as long as the fluid supply thereto is permitted to escape through the discharge passage or channel 37, 38 and 39. If the shaft 11 is at rest while shaft 10 is rotating at normal speed, the said discharge passage is alternately interrupted due to the fact that the cylinder 17 is rotated with the shaft 10, whereas the cylinder 25 being fixed to the shaft 11 in the present instance is stationary. Hence the discharge passage is interrupted, that is, the discharge of fluid from the chamber 33 is prevented while the bores 38 move intermediate adjacent slots 39 and fluid is discharged from the chamber as long as the bores 38 register with the slots 39. The interruption of the discharge passage causes building up of fluid pressure in the annular chamber 33. However, the period of time of interruption of this passage is very short if one shaft is operated at normal speed while the other shaft is at rest, the period of interruption as will be readily understood being determined by the time of travel of an opening 38 along the path intermediate adjacent slots 39. Now if shaft 11 is rotated and to be connected to the rotating shaft 10, it will be seen that as the relative speed between the two shafts decreases the period of time of interruption of said discharge passage increases. When the two shafts are almost in synchronism, for instance, the one rotating at 1800 R. P. M. while the other is running at 1799 R. P. M., it will take a considerable length of time for the bores 38 to move from one slot 39 to the next slot 39, that is, a considerable length of time will elapse while the bores 38 move relative to the slots 39 a length equal to the angular distance between adjacent slots 39. During this time the discharge passage for actuating fluid in the chamber 33 is interrupted and fluid pressure is built up in the chamber 33 sufficient to force the ring member 22 towards the left, that is, into engagement with the teeth 16 of the other clutch half. Once the ring member 22 has moved axially a distance equal to the axial length of the bores or slots 38, 39, which length in the present instance is equal to the diameter of the bores 38, the discharge of fluid from the chamber 33 through said discharge passage is permanently interrupted and therefore no longer affected by any relative angular movement between the two shafts. Disengagement of the two shafts is effected by relieving the fluid pressure in the chamber 33 whereby the ring member 22 is forced towards the right, that is, into disengaging position by the action of the springs 28.

Fig. 3 illustrates a clutch arrangement for connecting two shafts, one of which is driven by a gearing or like torque-transmitting means. Specifically, the arrangement includes a first shaft 50 which may be a drive shaft or a driven shaft, and a second shaft 51 to which is secured a gear 52 meshing with a drive gear 53. The clutch for connecting the shafts 50 and 51 comprises a first clutch half 54 connected to the shaft 50 and a second clutch half 55 connected to the shaft 51. The half 54 has an element 56 provided with a ring or row of teeth 57 which mesh with a row of teeth 58 of another element 59 forming at its front a plurality of teeth 60. The tooth connection 57, 58 between the two elements 56 and 59 permits slight adjustability of the element 59 which facilitates the engagement between the two clutch halves in case the two shafts 50 and 51 are not perfectly aligned. A cylindrical element 61 with a row of uniformly spaced slots 62 is secured to the element 59 by means of a plurality of bolts 63 so that the element 61 forms in substance a cylindrical extension of the one clutch half. The other clutch half comprises an element 64 forming an annular row of teeth 65 for cooperation with the teeth 60. The shaft 51 is supported by two bearings 66 and 67 opposite the gear 52. The second clutch half 55 is secured to one overhung portion of the shaft 51. Another overhung portion of the shaft 51 projects through a stationary wall 68 into a cylinder 69 secured to the wall 68. A piston 70 is slidably disposed in the cylinder 69 and comprises two halves 71 and 72 fastened together by a screw connection 73. The cylinder half 72 has an annular projection 74 to limit movement of the piston towards the right. The piston is prevented from rotatable movement by means of a key 75 secured to the cylinder 69 and projecting into a slot 76 in the outer surface of the piston. The piston is connected to the right-hand end of the shaft 51 by means including a ring member 77 disposed between the two piston halves 71 and 72 and securely fastened to the overhung shaft portion by a plug 78. To reduce friction due to rotation of the ring 77 within the piston, the adjacent surfaces of the two piston halves are formed by bearing metal 79. The position of the shaft 51 is indicated by an indicating rod 80 projecting through a plug 81 in the end wall of the cylinder 69 and fastened to a bar 82, which latter is secured to the piston half 72 by screws 83. A chamber 84 formed on the left-hand side of the piston is supplied with low pressure fluid, preferably liquid, through a conduit 85 connected to the chamber. The fluid pressure normally biases the piston and consequently the shaft 51 and the second clutch half into the right-hand end or disengaging position. A high pressure chamber 86 is formed on the right-hand side of the piston and means including a conduit 87 with a three-way valve 88 are provided for conducting and controlling the flow of high pressure actuating fluid such as oil to the chamber 86. In the drawings the valve 88 is shown in a position in which actuating fluid is discharged from the high pressure chamber. Turning the valve in clockwise direction by 90° connects the chamber 86 with the high pressure fluid supply pipe 87. The fluid supplied to the high pressure chamber serves to force the piston against the force exerted thereon by the low pressure fluid in the chamber 84 towards the left, that is, into engaging position of the two clutches.

The arrangement like that described in connection with Fig. 1 includes means for automatically effecting engagement of the clutch in response to a certain condition of the speed relation of the two shafts with regard to normal speed of one shaft, that is, this automatic means permits clutch engagement only when the two shafts are in synchronism or near synchronism. To this end a discharge channel for discharging high pressure fluid from the high pressure chamber is formed and means are provided for interrupting the discharge of fluid from said channel. In the present instance the shaft 51 has a bore 89 which at its right-hand end communicates with the chamber 86 and at its left-hand end communicates through a plurality of radial bores 90 with an annular recess 91 in the element 64. The latter has a plurality of channels 92 ending at one end in the recess 91 and at the other end in the slots 62 or the inner surface of the cylinder 61 intermediate said slots, depending upon the relative position between the cylinder 61 and the element 64.

The operation is as follows: Let us assume both shafts 50 and 51 are driven, the shaft 50 by a prime mover and the shaft 51 by another prime mover, through the intermediary of the gearing 52, 53. To connect the two shafts, that is, to effect engagement of the clutch, the valve 88 is turned 90° in clockwise direction so that high pressure fluid is supplied to the chamber 86. The high pressure fluid flows from the high pressure chamber through the bore 89, the channels 90, 91 and 92 and is discharged from the channel 92 through the slots 62 whenever said slots 62 and channels 92 register. Discharge of fluid from the channels 92 is prevented or interrupted while the end of the channel 92 travels intermediate adjacent slots 62. During that time fluid pressure is built up in the chamber 86. As soon as the speed relation between the two shafts has reached a predetermined value, that is, when the two shafts are near synchronism, it will take a considerable time for the shaft 51 to rotate relative to the shaft 50 a distance corresponding to the angular distance between two adjacent slots. During that time sufficient fluid pressure is built up in the chamber 86 to cause axial movement of the shaft 51 towards the shaft 50 and consequently engagement of the clutch. The discharge of fluid from the high pressure chamber 86 is permanently prevented once the shaft 51 has been moved axially a distance corresponding to the width of the slots 62.

From the above it is clear that the speed relation at which engagement of the clutch takes place, the relative speed of the shafts depends upon the normal speed of one of the shafts, the pressure of the actuating fluid, the diameter of the bores 92, the length of the slots 62 and the distance between them. Depending upon the particular arrangement in which the clutch is used, it may at times be desirable to effect engagement at a speed relation of 99.9% and in other cases clutch engagement may be permissible at 99% speed relation. By "99% speed relation" I mean a relation in which one shaft rotates at a speed equal to 99% of that of the other shaft. Obviously, adjustment of the speed relation may be easily effected by varying the pressure of the actuating fluid or changing one of the aforementioned dimensions. The latter is accomplished in the arrangement of Fig. 3 with regard to the length of the slots 62 and the distance between them by the provision of a ring 93 adjustably secured to the cylinder 61 and having the same number of uniformly spaced slots as the cylinder 62. With this arrangement adjustment of the ring 93 by rotating it relative to the cylinder 61 effects adjustment of the effective length of the discharge slots.

What I claim is new and desire to secure by Letters Patent of the United States:

1. Clutch arrangement including the combination of two shafts, a clutch including a toothed half secured to one shaft and another toothed half secured to the other shaft, means for automatically effecting engagement of the two halves during rotation of the shafts to mechanically connect them in response to a certain speed relation of the shafts, said means including an axially movable element disposed within one of the halves, a pressure chamber formed in said half, and means for automatically building up fluid pressure in the chamber in response to decreasing relative speeds between the two halves.

2. Clutch arrangement including the combination of two shafts, a clutch including an element with a row of teeth secured to one shaft and another element with another row of teeth connected to the other shaft, and adjustable hydraulically operated means for automatically effecting movement of one of the elements to effect engagement between the teeth and to mechanically connect the shafts during rotation in response to a certain speed relation between the shafts, said means comprising a pressure chamber formed in one of the halves, inlet and outlet channels for the chamber, at least one of said channels being formed partly in one element and partly in the other element to effect building up of fluid pressure in the chamber with decreasing relative speed between the elements.

3. Clutch arrangement including the combination of two shafts, a clutch having one toothed half mechanically connected to one shaft to be positively rotated by said shaft and another half including a toothed axially movable element mechanically connected to the other shaft to be positively rotated by said other shaft, and means disposed at least partly within said halves for automatically effecting movement of said toothed element to engage the toothed half and to mechanically connect the two shafts in response to a fixed speed relation of the shafts, said means comprising a pressure chamber formed in one half and channels formed in both halves and arranged to effect increasing fluid pressure in the chamber with decreasing relative speed between the halves.

4. Clutch arrangement including the combination of two shafts, a clutch having a half connected for positive rotation with one shaft and another half connected for positive rotation with the other shaft, an axially movable element forming part of and disposed within one of the halves and hydraulically operated means associated with said element and including a fluid pressure chamber formed in one half and a fluid path controlled by the relative movement between the two halves to effect increase in pressure in the chamber in response to decreasing relative speed between the halves for effecting engagement of the two clutch halves during operation as they approach synchronous speed relation.

5. Clutch arrangement including the combination of two shafts, a clutch for mechanically connecting the shafts having one half secured to one shaft and another half secured to the other shaft, and hydraulically operated means for effecting movement of one half to engage the other half and to mechanically connect the shafts, said means including a channel for actuating fluid which channel is formed partly by an opening in one half and partly by an opening in the other half and a pressure chamber formed in one half, the pressure in said chamber varying in response to changes in the speed relation between the shafts.

6. Clutch arrangement including the combination of two shafts, a clutch having a half secured to one shaft and another half secured to the other shaft, and hydraulically operated means for effecting engagement between the two halves to mechanically connect the shafts in response to a predetermined speed relation of the shafts, said means including a pressure chamber formed in one half, a supply channel for conducting fluid to the pressure chamber and a discharge channel for discharging fluid from the pressure chamber and means including a channel in the other half for controlling the flow of fluid through the discharge channel in response to relative movement of the shafts.

7. Clutch arrangement including the combination of two shafts, a clutch having an element with a row of teeth secured to one shaft and another element with a row of teeth connected to the other shaft, means for normally biasing the other element to disengaging position, and hydraulically operated means for moving the other element to effect engagement between the two rows of teeth in response to a predetermined speed relation of the shafts, said hydraulically operated means including a fluid pressure chamber, channels partly formed in one of the shafts for conducting fluid to and discharging fluid from the chamber and means for varying the flow of fluid in said channels in response to changes of speed relation of the shafts.

8. Clutch arrangement including the combination of two shafts, a clutch having an element with a row of teeth secured to one shaft, another element with a row of teeth connected to the other shaft, means for normally biasing the other element into disengaging position, and hydraulically operated means for moving the other element to effect engagement between the two rows of teeth in response to a predetermined speed relation of the shafts, said hydraulically operated means including a fluid pressure chamber, a discharge channel for discharging fluid from the chamber, and means for reducing the discharge of fluid through the channel to effect increase in pressure in the chamber as the speed of one shaft approaches that of the other shaft.

9. Clutch arrangement including the combination of a first shaft and a second shaft, a first clutch half including a first element with a row of teeth secured to the first shaft and a cylinder fastened to the element and forming an extension axially beyond the element, a second clutch half having a second element secured to the second shaft, a ring member splined to the second element to be positively rotated thereby and axially slidable relative thereto and a cylinder secured to the second element and surrounding the ring member, means biasing the ring member into disengaging position, and hydraulically operated means including said cylinders for effecting axial movement of the ring member in response to a predetermined speed relation of the shafts.

10. Clutch arrangement including the combination of a first shaft and a second shaft, a first clutch half including a first element with a row of teeth secured to the first shaft and a first cylinder fastened to the element and forming an extension axially beyond the element, a second clutch half having a second element secured to the second shaft, a ring member splined to the second element to be positively rotated thereby and axially slidable relative thereto and a second cylinder telescoping the first cylinder and secured to the second element and surrounding the ring member, spring means connected between the second cylinder and the ring member for biasing the latter into disengaging position, and means for automatically effecting engagement between the teeth of the two clutch halves comprising a chamber formed between the ring member and the second cylinder, channel means for conducting fluid under pressure to the chamber and channels controlled by the telescoping portions of the cylinders for discharging fluid from the chamber.

11. Clutch arrangement including the combination of a first shaft and a second shaft, a clutch having a first half secured to the first shaft and a second half secured to one end of the second shaft, means for automatically effecting engagement between the two halves to mechanically connect the shafts in response to a predetermined speed relation between them, said means comprising a cylinder secured to the first clutch half and telescoping the second clutch half, a cylinder enclosing the free end of the second shaft, a piston secured to said free end and slidably disposed in the cylinder, means for conducting low pressure fluid to one side of the piston to force the second shaft into disengaging position, and means for conducting high pressure fluid to the other side of the piston and channels formed in the second shaft and in the second clutch half and in said telescoping cylinder for discharging and controlling the discharge of high pressure fluid from said cylinder.

JOHN H. DORAN.